Figure 1:
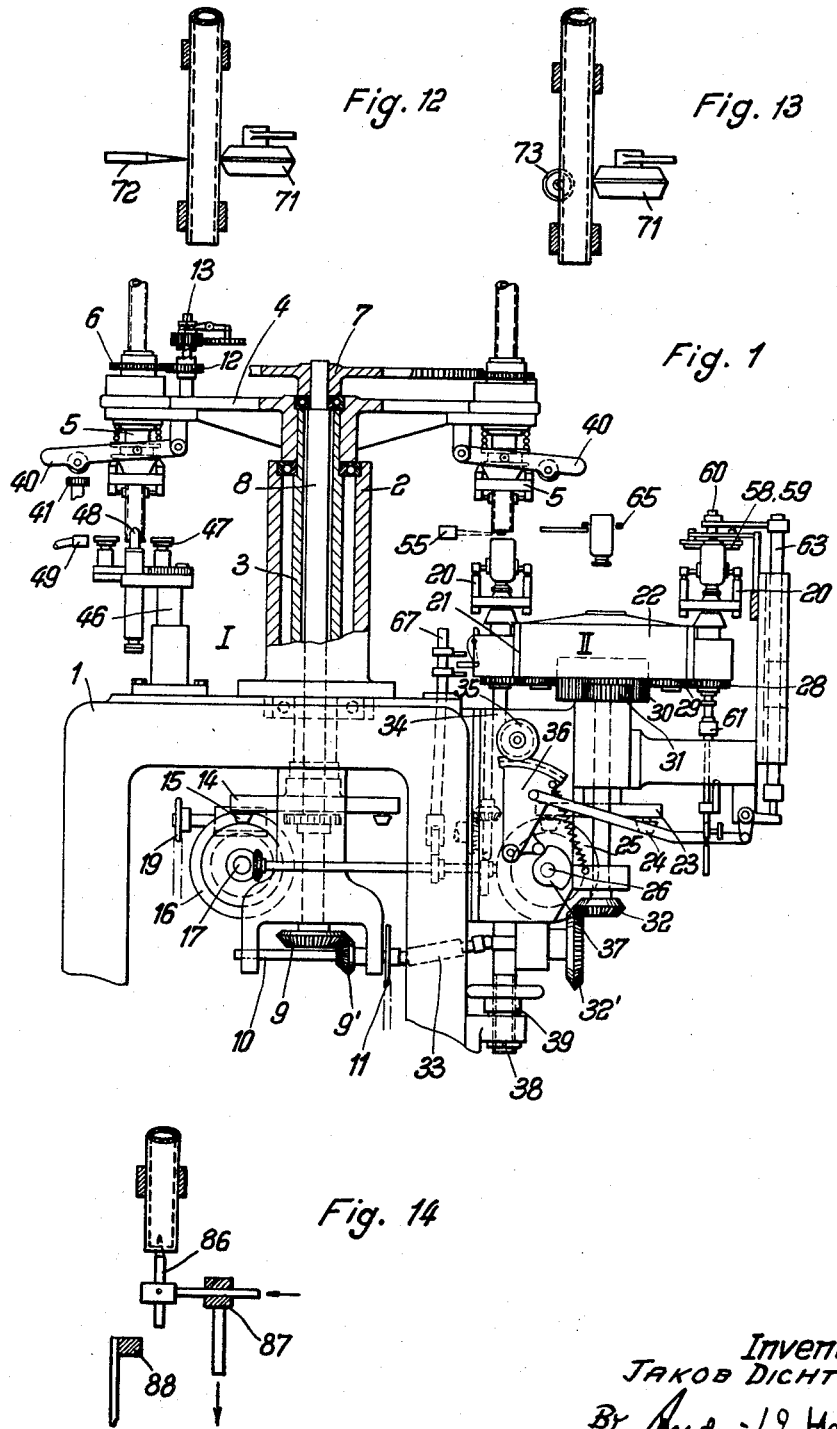

May 10, 1960
J. DICHTER
2,935,819
MACHINE FOR THE MANUFACTURE OF SMALL GLASS
BOTTLES OR THE LIKE FROM GLASS TUBES
Filed June 7, 1955
3 Sheets-Sheet 3
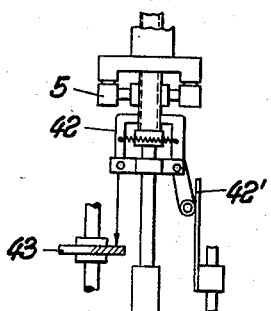
Fig. 3 — Station A
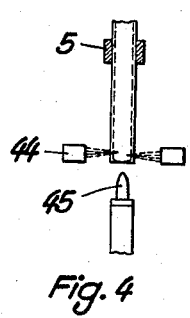
Fig. 4 — Station C-D-E
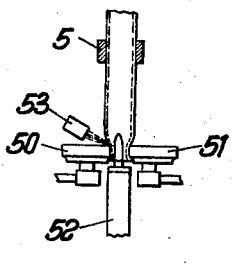
Fig. 5 — Station H
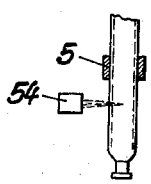
Fig. 7 — Station J-K
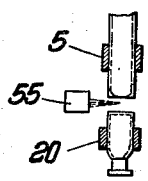
Fig. 8 — Station L
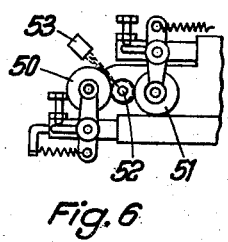
Fig. 6 — Station H
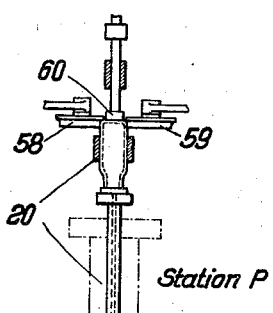
Fig. 9 — Station P
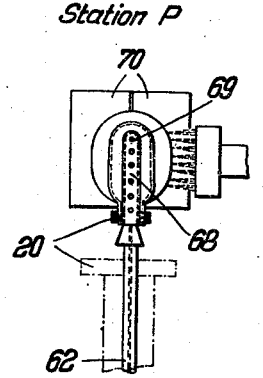
Fig. 10 — Station P
Fig. 11 — Station M
Inventor:
JAKOB DICHTER
By *[signature]*
ATTORNEY

United States Patent Office 2,935,819
Patented May 10, 1960

2,935,819

MACHINE FOR THE MANUFACTURE OF SMALL GLASS BOTTLES OR THE LIKE FROM GLASS TUBES

Jakob Dichter, Berlin-Schoeneberg, Germany

Application June 7, 1955, Serial No. 513,707

8 Claims. (Cl. 49—7)

This invention concerns a machine for the manufacture of small glass bottles or the like from glass tubes.

One known machine of this kind has a frame with two oppositely disposed claws arranged symmetrically with the axis of rotation of the frame for gripping two glass tubes in the vertical position. This frame can take up four positions displaced from one another by 90° and so the claws feed to four working positions. In the first of these, the previously completed bottom, formed at the lower end of the glass tube which is not now rotating, is drawn down by a suction device, the jagged edge thereby occurring is smoothed as far as possible by rotation of the tube in the next working position and is expanded by an inserted mandrel, whereupon in the next working position the tube is again caused to rotate and the bottle neck is formed in one operation by means of shaping tools. During the operation the glass tube only projects sufficiently far out of the holding claws to enable it to reach the burner and shaping pieces.

When the tube with the shaped bottle neck thus reaches the last working position, it is lowered with the shaped part leading and allowed to fall freely through a distance corresponding to about the length of the small bottle, and arrives in a second rotatable frame likewise equipped with two claw holders, in which the shaped piece is held, heated by means of a burner, drawn off and separated, with the formation of two bottoms. The base of the separated small bottle piece is shaped under vacuum by means of compressed air with the second frame turning in step with the first and finally the completed small bottle is ejected. The tube stock lowered through a distance corresponding to the length of one bottle is carried by the rotation of the first frame back into the first working position.

Such a machine can thus only ever accept two workpieces simultaneously. Since the tube should only be turned in three working positions, whilst it must remain stationary on the suction device for breaking open the bottom, and moreover since the rotary speeds are different in the other working positions, a special gear wheel drive is thus provided, including means for engaging and declutching the gear wheels for each working position. An uneven drive and seizing thereof can easily occur with such an arrangement; the shafts therein must in part be resiliently mounted and, since a rigid driving means cannot be interposed, a belt drive must be employed. Furthermore, since only one working position is available for the preforming of the tube mouth and a second for the final shaping of the bottle neck, these operations cannot be carried out with sufficient exactitude. Moreover, the piece of tube to be worked cannot be kept permanently heated.

At the drawing-off position, the still unheated tube projecting out of the holding claws must first be heated, so that the operation at this position requires a considerable time.

Finally the bursting open of the tube bottom produces a jagged edge which is separated into fibres preventing the formation of a completely smooth neck end. The known machine therefore has a low output and is not suitable for the completion of entirely perfect small bottles, as required for modern medicinal substances.

It is therefore an object of the invention to obviate all these disadvantages by providing a machine for the manufacture of small glass bottles from glass tubes, constructed in accordance with known machines, especially rotary machines, for the manufacture of ampoules with points or the like.

Another object of the invention is to divide the manufacturing procedure into a larger number of operations than have been required heretofore, all of which operations require approximately the same time.

According to the present invention, a machine for the manufacture of small glass bottles from glass tubes includes two groups of holders which viewed in plan run through two adjacently disposed and mutually contacting closed paths containing working stations, whereby at the contact point of said paths a separated piece of the glass tube which until then has been carried by a holder of the first group is taken over by a holder of the second group, characterised in that in the vicinity of the separation point (either at the separation point itself or in the working station following it) a burner device or cutter device is provided, which forms the lower end of the tube stock with a smooth-edged opening.

With the machine constructed in accordance with the invention, the drawing off and the separation of the body of the bottle from the tube stock requires only a little time and not more than the other operations, since the tube has already been drawn so far out of the holder at the first station that the potential separation point is exposed and can be heated before the drawing-off station.

In the production of small glass bottles which are not to be closed by means of a stopper but by capsules, and which therefore must present a completely smooth, plane surface on the neck of the small bottle, it is very essential that the tube end should not be shaped unevenly on opening the bottom, as occurs during the breaking-open operation in the known machine, due to which a ragged edge arises.

The production of a ragged edge during the opening of the bottom is avoided by the machine constructed according to the invention wherein, during the separation by means of a sharp flame precautions are taken to prevent the formation of a bottom on the tube stock, in which case if necessary, if the separated piece is also not to have a bottom, by suitable control of the drawing-off operation the formation of a bottom on said piece can also be avoided; or alternatively the bottom formed on the tube stock is reopened by means of a burner in the separating position or in the working position following the separating position.

Because of the fact that the glass tube does not drop down freely after the separation and opening of the bottom on the feed stroke, but is gripped by tongs and guided down without rotation, detrimental deformation of the soft edge of the tube is avoided.

If the formation of the separated smooth-edged opening is effected by means of a sharp burner nozzle fed with a mixture of gas and oxygen, which nozzle operates on the midpoint of the closed end of the tube in such a way that the latter is opened due to the surface forces caused by the heating, then it has been found that with viscous glasses this opening due to the surface forces is not always attained, since the applied heat is not always concentrated on the mid-point of the end of the tube, but on the contrary widens and divides in the direction of the wall, so that the tube does not become opened by the burner flame alone.

Thus a further object of the invention resides in an arrangement adapted positively to effect this opening even in the case of viscous glasses, and still further to produce a uniform opening therein.

According to this feature of the invention a pointed, needle-shaped pin 86 on a movable support 87 (Fig. 20) is arranged adjacent the burner nozzle 56 (Fig. 11), which pin, at the instant when the glass has been heated to white heat, is thrust in the direction of the axis of the glass tube and pierces through the thin skin of the end of the tube, after which it is withdrawn again.

In order to impart uniform dimensions to the opening the movement of the pin in the direction of the tube axis towards the centre of the tube can also be complemented by a movement transversely to the axis of the tube, and indeed to such an extent as is permitted by the diameter of the opening to be produced.

The needle-shaped pin preferably consists of a heat-resisting material. In order to avoid the same sticking to the heated glass, the point of the pin 86 may be provided with lubricating means before the opening operation is carried out on the tube, e.g. by previously wiping the pin over a pad 88 (Fig. 20) soaked with oil or other lubricating means, or by powdering said pin.

During and also after the opening of the end of the tube by means of the pointed pin, the heating of the end of the tube can be continued, or it can alternatively be periodically interrupted.

The invention thus provides a machine which is novel in the whole of its construction and in its manner of operation, and which is very efficient and gives a completely satisfactory production.

Figure 2:
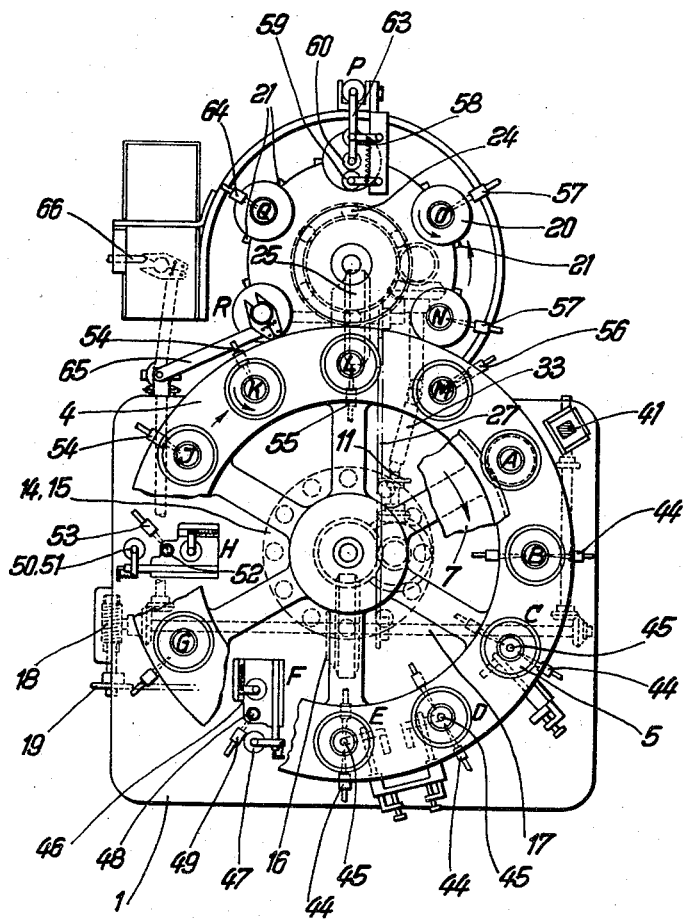

The invention will be described further, by way of example, with reference to the accompanying drawings, in which:

Fig. 1 is a side elevation of a machine constructed in accordance with the invention, Fig. 2 is a plan view of the machine, and Figs. 3 to 14 illustrate individual elements of the machine.

A pedestal bearing 2, in which is journalled a hollow shaft 3, is mounted on a frame 1, and on the upper end of the shaft 3 is mounted a supporting ring 4 which carries a number of chucks. These are rotatable and are moved in common by means of spur gears 6 via a large wheel 7. This wheel 7 is mounted on a shaft 8 which is driven by bevel wheels 9 and 9', the shaft 10 of the latter being driven in turn via a wheel 11 by means of a regulable drive located in the frame. The chucks 5 can thus be given any desired speed of rotation. The drive of wheel 6 may also be effected over an intermediate wheel 12 with a claw clutch 13. This clutch may be axially engaged and disengaged by suitable conventional means such as a cam disc actuating a linkage. Each chuck 5 may have its own clutch so that each chuck can be individually released. In either arrangement the drive is effected over a suitable conventional variable speed means whereby different speeds of rotation may be given to chuck 5.

A switching plate 14 with rollers 15 is mounted at the lower end of the hollow shaft 3. By means of these elements the hollow shaft 3, together with the supporting ring 4 can via the curved plate 16 be given an intermittent rotational movement through which the chuck is taken to the different working positions of the stations A, B, C, D, E, F, G, H, I, K, L, M. The curved plate 16 is mounted on a shaft 17, the drive for which is derived from a worm drive 18 and sprocket wheel 19, which is likewise actuated by a regulable drive. Thus the switching from one station to another or the working speed respectively can be altered within wide limits. On the right-hand side of the machine there is mounted a second lower set of chucks 20, which are retained in guides 21 in a frame 22. The frame 22 is rotated intermittently in the same period as the supporting ring 4 by means of a switching plate 23 with rollers 24 and via the curved plate 25. The latter is mounted on a shaft 26 which is driven by a chain drive 27 from the shaft 17. The rotational movement of the chuck 20 is effected by way of spur wheels 28, 29 together with the wheel 30 which receives its drive from a spur wheel 31 and a bevel wheel pair 32 and 32'. The bevel wheel pair is connected by way of an articulated shaft 33 with the driving wheel 11, which together with the chucks 5 and 20 is given the same driving speed and direction of rotation.

The lower chucks 20 are vertically displaceable in the guides 21, the displacement resulting from the plunger 34 formed with a racked bar and the spur wheel 35, in turn actuated by a toothed segment 36 and curved plate 37. For the purpose of manufacturing bottles of different dimensions frame 22, together with the chucks 20 and their driving elements, are vertically displaceable as a whole together with their pedestal bearing by means of a threaded spindle 38 and the hand wheel 39, whereby all movable elements take part in the adjustment. The articulated shaft 33 permits the displacement without interruption of the drive.

The operation of the machine is as follows:

In the example of construction shown, the glass tube is led into the working position A or respectively towards H in the chuck 5, which is previously opened through the lever 40 by means of the trigger 41, and the individual rotation of which has preferably been disengaged by disconnection of the clutch 13. There it is gripped by the tongs 42 and lowered, whereby the adjustable and preferably rotatable stop 43 determines the limit and therewith the desired length of the bottle (Fig. 3). The glass tube thus projects out of the chuck and downwardly on to a flattener which corresponds to the length of the bottle and that of the fusing position.

After the opening of the tongs 42 by means of the trigger 42' and closing of the chuck 5, the latter is further conveyed to the working position B due to the intermittent movement of the supporting ring 4. There is there located a burner 44 which heats the lower end of the glass tube. The same also takes place by means of other burners 44 in the stations C, D and E, Fig. 4, in which are arranged movable mandrels 45. These engage into the openings of the glass tubes and prevent collapse of the rims and widen them according to requirements. Some of these mandrels have collars by means of which the glass tube is expanded and its softened end is thickened. The mandrels are vertically and laterally adjustable. The mandrel 48 is located at the station F together with the tongs 46 driven by the rollers 47 and provided with shaped elements. These elements are easily adjustable and are sprung. They have the purpose of preforming the glass for the neck during simultaneous heating by means of the burner 49.

The glass tube is further heated in the station G and is then taken to the station H, Figs. 5 and 6. The neck there receives its final form by means of the rollers 50, 51 and the mandrel 52 with the help of the burner 53.

The mandrels 45, 48 and 52 are cooled according to requirements with air or water. The arrangement can also be such that at least one of the shaping tools brought to bear externally against the tube piece is provided on the contact surface with a thread so that a thread may be produced on the outer wall of the neck. Similarly the shaping mandrel inserted into the mouth of the neck may possess a thread on the contact surface into contact with which the glass is brought by means of tools engaging externally, the mandrel is frictionally rotated by and together with the glass tube, whereby after the conclusion of the shaping the rotation of the mandrel is stopped and the latter is screwed out of the glass.

The bottle piece is then in stations I and K heated by means of the burner 54 at the place at which it is to be separated from the tube. As can best be seen in Figs. 1 and 8, the machine comprises at this place two chucks one above the other. The upper chuck forms part of the first group of chucks 5 and the lower chuck forms part of the second group of chucks 20. The lower chuck serves to receive the partly formed bottle after the separation thereof from the tube stock and to this end encompasses with a certain play the glass tube. As can be seen in Fig. 1 an abutment is provided below chuck 20 in alignment with the axis of the glass tube. The bottle falls upon this abutment when separated from the tube stock. The separation takes place in the station L, Fig. 8, in which, with a substantial supply of heat from the burner 55, the bottle piece is gripped by the initially open chuck 20 which is subsequently closed by the arrangement 67, Fig. 1, and is drawn downwardly from the tube. The bottle bottom thereby forms itself on the bottle piece which is drawn off. Dependent upon the adjustment of the burner 55 no bottom may form on tube end and after the glass tube in the upper chuck 5 has been further conveyed to the station M, a bottom may be subsequently fused by the burner 56 on to the rim, or an open bottom is opened by the burner 56 by melting off at the tube end. If open vessels are to be manufactured instead of bottles with bottoms, then the formation of a bottom on the separated piece is also prevented in that the flame of the burner 56 may be allowed to heat only a narrow area, and a strong pull is effected by means of the bottom chuck 20.

Means can also be provided for notching and breaking off the tube piece with the bottom. For instance, the hot glass may be cracked off by means of a cold roll and be notched by a sharp tool 72 to facilitate the cracking as is shown in Fig. 12.

Fig. 13 shows an arrangement in which a burner 73 and a cold roll 71 coacting therewith are employed to effect the cracking-off of the hot glass.

From the station M the stock tube is conducted again to the station A. Here the chuck 5 is opened by means of the trigger 41, whereby in a preferred manner its rotation is cancelled by disengagement of the clutch 13 and simultaneously the glass tube is gripped by the tongs 42 and drawn so far downwardly that after the opening of the tongs 42 it falls freely only a small amount towards the stop 43 so that its soft rim is not deformed. After being transferred the tube piece is now manipulated again in the manner described above.

During this time the bottle or the separated article as the case may be is brought by the lower chuck 20 to the stations N and O. Thus if a bottle bottom is to be produced on separation this is there heated by the burner 57. At the same time air is blown from below into the bottle as shown in Fig. 9, in order not to allow the bottom to fall in.

The bottom is formed in the station P, Fig. 9. This takes place by means of sprung rollers 58, 59 and a special bottom plate 60, which is adapted to the form of bottom at any time desired, whilst air is again blown in from below through the nozzle 61 via the blast tube 62. Nozzle 61 is movable and may be lifted in vertical direction by suitable lifting means against the lower mouth of blast tube 62 in sealing engagement therewith. The blowing-in of air serves the purpose of producing an inner pressure within the glass bottle while the melting of the bottom is completed to prevent a sagging of the bottom while the same is still soft. In this way the manufacture of a uniform platform bottom is made possible. The bottom plate 60 is raised by means of the rods 63 if the bottle is to be conveyed further. Simultaneously the blast nozzle 61 also disengages itself from the mouth of the blast tube 62 by means of a downward movement (not shown).

The bottle bottom is subsequently cooled in the station O by means of the burner 64. In the station R the prepared bottle is then gripped by the tongs 65. The chuck 20 thereby opens. The bottle is withdrawn and swung outwardly where the tongs 65 allow it to fall out.

During this time the opened chuck proceeds once again towards the station L where it is raised by the plunger 34 in order to hold the new bottle piece.

The process begins here once again, in that the next bottle is withdrawn from the tube. If the article separated at L is to be fused or broken off without the formation of a bottom, then the edge portion directed upwardly is shaped after heating by means of the burner and the rollers 58, 59 at the station P. Instead of the bottom plate 60 a mandrel adapted to the shape of the opening can be inserted.

According to the invention the bottom chuck in station L grips directly on the previously formed neck end. Thus it is attained that very short vessels can be prepared which has not hitherto been possible. The jaws of the chuck may then correspond to the shape of the neck.

In this connection it is also possible partly or wholly to shape the tube part connected to the neck end.

As shown in Fig. 10 the tube piece is gripped by the chuck 20 on the previously shaped neck, the part lying above the chuck is heated by means of a burner and is then blown with the admission of air either freely or in a mould 70. This method of operation offers, relative to the manipulation of an article hanging in a downward direction, the advantage that the glass does not sink during heating, but on the contrary advantageously thickens itself. In order to avoid an excessive collapse, according to the invention a support 68 is preferably introduced into the interior on which the bottom can lie, whereby if necessary air can be introduced through lateral bores 69 in the support.

According to the invention a further threaded or rolled rim neck can be formed if necessary by means of the device in station F and a part of the same can be shaped into a constricted neck by means of the device in station H (wash bottle).

According to the invention the secondary thrust of the stock tube does not take place at the separating point L, but on the contrary before the separation; this implies that the secondary thrust can also take place after the shaping operation at station H. The opening of the bottom on the stock tube can also be so effected that the oppositely situated end is fused or sealed off, whereby the air located in the interior prevents the formation of a bottom or if such exists, opens it.

During the manufacture of necks with substantial rim reinforcements the body portion to be separated does not cool quickly enough up to the time when it is gripped by the chuck 20, so that during the clamping fractures arise. In order to expedite this cooling the shaped neck and the body portion connected thereto are blown by means of air in the working position after the shaping operation but before entry into the separating position, so that the temperature of the neck lies beneath the temperature of the clamping chuck. Thus, in spite of the previously effected manufacture for the melting off operation, a rapid working tempo is made possible also for short and especially also for wide articles.

I claim:

1. A machine for manufacturing a small glass bottle from a glass tube, comprising a first chuck for grasping a first portion of the tube, a first support means for said first chuck supporting the chuck for movement in a closed path, a plurality of peripherally spaced first work stations traversed by said first support means and the tube, means at at least one of said first stations for shaping an end portion of the tube carried by the first chuck, another of said first stations being a transfer station, a second chuck for grasping the shaped portion of said tube at the transfer station, second support means adapted to support said second chuck for movement in a closed path, the paths of said first chuck and of said second chuck overlapping peripherally at said transfer station and being vertically spaced, synchronized drive means for both said first and said second support means to bring said first chuck and said second chuck into vertical registry at said transfer station, severing means adjacent the transfer station for severing a tube grasped by both said first and second chucks, and a plurality of peripherally spaced second work stations traversed by said second support means and the severed end of the tube grasped by the second chuck.

2. A machine as defined in claim 1 wherein said first support means supports a plurality of first chucks, and said second support means supports a plurality of second chucks, each of said first chucks coming into registry in sequence with successive individual second chucks at the transfer station.

3. A machine for manufacturing a plurality of small glass bottles from multi-bottle lengths of glass tubing, comprising a group of first chucks each of which grasps a length of tubing, first support means for supporting said group of first chucks for movement in a closed path, drive means for said first support means, a group of peripherally spaced successive first work stations underlying said first chucks and to which said first support means progressively moves said first chucks to present sequentially the lower end of each length of tubing, one of said group of first stations being a first transfer station, means at another station of said group of first stations to form a bottle neck on the lower end of each tube grasped by a chuck of the first group, a group of second chucks, a second support means carrying said group of second chucks for movement in a second closed path at a lower level than said first support means, drive means for said second support means, means for synchronizing said first and second drive means to bring said first group of chucks and said second group of chucks sequentially into vertical registry at said transfer station, a group of peripherally spaced second working stations to which said second support means successively moves said second chucks, said second group of stations including a second transfer station vertically aligned with and underlying the first transfer station, means at the second transfer station for engaging each of said second group of chucks with a previously formed bottle neck at the transfer station, means at the transfer station for severing a length of tubing intermediate the chucks as the tubing is engaged thereby, and means at at least one of the second group of work stations to form a bottom on the upper end of the severed lengths of tubing grasped by the second chuck.

4. A machine for manufacturing a glass bottle from a length of glass tubing comprising a rotatable first support means, means for rotating the first support means, a first chuck carried by the first support means for movement in a closed path, the first chuck engaging a length of tubing with a free end thereof depending below the chuck, a plurality of first work stations peripherally spaced beneath the support means and to which the tubing free end is sequentially presented upon rotation of the first support means, said first stations including at least one station at which the tubing free end is formed into a bottle neck and a first transfer station, severing means at said transfer station for severing the tubing free end from the remainder of the tubing grasped by the first chuck, a rotatable second support means disposed at a lower level than said first support means, means for driving said second support means in synchronism with said first support means, the first and second support means overlapping, a second chuck carried by the second support means for movement in a closed path underlying and spaced from the path of the first chuck, means for engaging the second chuck with a bottle neck of the tubing at the transfer station prior to severing of the tubing, and a group of second working stations peripherally spaced above the closed path of the second chuck and including at least one station at which a bottle bottom is formed on the severed length of tubing.

5. A machine for manufacturing a small glass bottle from a glass tube, comprising a first chuck for grasping a first portion of the tube, a first support means for said first chuck supporting the chuck for movement in a closed path, a plurality of peripherally spaced first work stations traversed by said first support means and the tube, said first stations including in succession, an initial station at which a portion of the tube carried by the first chuck is shaped into a bottle neck on one end of the tube, an intermediate transfer station, and a final station, a second chuck for grasping a second portion of said tube at the transfer station, second support means adapted to support said second chuck for movement in a closed path, the paths of said first chuck and of said second chuck overlapping peripherally at said transfer station and being vertically spaced, synchronized drive means for both said first and said second support means to bring said first chuck and said second chuck into vertical registry at said transfer station, severing means adjacent the transfer station for severing the tube intermediate the first chuck and the second chuck, simultaneously grasping the tube, means at said final station of said first stations for forming a smooth opening in the lower severed end of the tube retained by the first chuck, and a plurality of peripherally spaced second work stations traversed by said second support means.

6. A machine as defined in claim 5, wherein the means at the final station of the first stations comprises a burner.

7. A machine as defined in claim 1, wherein the severing means comprises a burner, a cool cutting tool, and means for guiding the tool into engagement with that portion of the tube intermediate those portions grasped by the first chuck and the second chuck.

8. A machine as defined in claim 5, wherein said first stations also include a station at which means engage the tube and pull the tube downwardly axially of the first chuck prior to shaping of the neck portion.

References Cited in the file of this patent

UNITED STATES PATENTS

| | | |
|---|---|---|
| 1,024,116 | Burrows | Apr. 23, 1912 |
| 1,587,466 | Brown et al. | June 1, 1926 |
| 1,749,016 | Boals | Mar. 4, 1930 |
| 2,151,840 | Dichter | Mar. 28, 1939 |
| 2,266,417 | Eisler | Dec. 16, 1941 |
| 2,595,077 | Hughes et al. | Apr. 29, 1952 |

FOREIGN PATENTS

| | | |
|---|---|---|
| 626,567 | Great Britain | July 18, 1949 |